US012220724B1

(12) United States Patent
Grzesiczek

(10) Patent No.: US 12,220,724 B1
(45) Date of Patent: Feb. 11, 2025

(54) METHOD FOR SPRAY DYEING USING INFRARED IRRADIATION

(71) Applicants: KEUM WOO GLOBAL Inc., Seoul (KR); Adrian Grzesiczek, Banten (ID)

(72) Inventor: Adrian Grzesiczek, Banten (ID)

(73) Assignee: Adrain Grzesiczek, Banten (ID)

( * ) Notice: Subject to any disclaimer, the term of this patent is extended or adjusted under 35 U.S.C. 154(b) by 0 days.

(21) Appl. No.: 18/420,870

(22) Filed: Jan. 24, 2024

(30) Foreign Application Priority Data

Jan. 15, 2024 (KR) ........................ 10-2024-0005902

(51) Int. Cl.
*G09B 5/02* (2006.01)
*B05D 1/02* (2006.01)
*B05D 3/02* (2006.01)

(52) U.S. Cl.
CPC ............ *B05D 3/0263* (2013.01); *B05D 1/02* (2013.01); *B05D 2201/02* (2013.01); *B05D 2602/00* (2013.01)

(58) Field of Classification Search
CPC .............. B05D 3/0263; B05D 2201/02; B05D 2602/00
See application file for complete search history.

(56) References Cited

U.S. PATENT DOCUMENTS 8,814,953 B1 8/2014 Abbott et al.
2022/0136170 A1* 5/2022 Zhou ......................... D06P 5/22 428/32.16

FOREIGN PATENT DOCUMENTS

KR 200252516 B1 11/2001

* cited by examiner

*Primary Examiner* — Nathan T Leong
(74) *Attorney, Agent, or Firm* — NKL Law; Jae Youn Kim

(57) ABSTRACT

A spray dyeing method includes continuously moving a substrate in a direction; spraying an organic pigment onto the substrate using a spraying system while moving the substrate forward through a dyeing station; and allowing the substrate coated with the organic pigment to pass through a drying station including an infrared irradiation unit to cure the organic pigment. Using the spray dyeing method, in fiber or fabric dyeing, it is possible to dye using a much smaller amount of water by opening a molecular structure of a polymer that makes up the substrate through infrared irradiation after dyeing by pigment spraying to cure the pigment.

4 Claims, 4 Drawing Sheets

METHOD FOR SPRAY DYEING USING INFRARED IRRADIATION

CROSS-REFERENCE TO RELATED APPLICATION

This application claims priority to Korean Patent Application No. 10-2024-0005902, filed on Jan. 15, 2024 and all the benefits accruing therefrom under 35 U.S.C. § 119, the contents of which in its entirety are herein incorporated by reference.

BACKGROUND

1. Field

Embodiments relate to a spray dyeing method. More particularly, embodiments relate to a method for dyeing fiber or fabric by opening a molecular structure of a polymer that makes up a substrate through infrared irradiation after dyeing by pigment spraying to cure the pigment, which accomplishes dyeing with a much smaller amount of water.

2. Description of the Related Art

In fabric dyeing, there is a spray dyeing method that sprays a liquid, breaking the liquid into small droplets through a device that is supplied with liquid dyes or pigments and rotates at high speed. For example, Korean Utility Model No. 20-0252516 discloses a fabric dyeing device including an air and dye solution spraying device for spraying high pressure air and a dye solution onto a fabric to ease adsorption of the dye solution.

The spraying device is also called an atomizer, and functions to deliver the dye and pigment in an accurate and controlled manner. Since the use of the atomizer gives consistent coloring to a product while maintaining accuracy, the atomizer is used in industrial production for efficient and high quality color spraying.

However, the conventional dyeing method using the spraying device can be only applied to yarn dyed fabrics that are woven using dyed yarns, and the used dye is limited to indigo dye, not an organic pigment. Additionally, to complete the dyeing process, the conventional dyeing method requires not only the dye spraying process but also additional processes such as washing and drying, and in this process, a large amount of water is used, causing environmental pollution.

SUMMARY

According to an aspect of the present disclosure, a spray dyeing method for fiber or fabric dyeing is provided. The spray dyeing method uses a much smaller amount of water by opening a molecular structure of a polymer that makes up a substrate by infrared irradiation after dyeing by pigment spraying to cure the pigment.

A spray dyeing method according to an aspect of the present disclosure includes: continuously moving a substrate in a direction; spraying an organic pigment onto the substrate using a spraying system while moving the substrate forward through a dyeing station; and allowing the substrate coated with the organic pigment to pass through a drying station including an infrared irradiation unit to cure the organic pigment.

In an embodiment, curing the organic pigment includes irradiating infrared light in a first wavelength band onto the substrate coated with the organic pigment; and after irradiating the infrared light in the first wavelength band, irradiating infrared light in a second wavelength band onto the substrate, wherein the second wavelength band is different from the first wavelength band.

In an embodiment, the first wavelength band is 0.78 to 2.5 μm.

Additionally, in an embodiment, the second wavelength band is 50 to 1000 μm.

The spray dyeing method according to an embodiment further includes, after curing the organic pigment, transferring the substrate to a collector without cleaning the substrate with a liquid including water.

By the spray dyeing method according to an aspect of the present disclosure, in fiber or fabric dyeing, dyeing is carried out by spraying an organic pigment through an atomizer, and after the dyeing, the pigment is cured after opening the molecular structure of the polymer that makes up the fabric by infrared irradiation. This makes it possible to dye using a much smaller amount of water compared to the conventional technology.

Using the spray dyeing method according to an aspect of the present disclosure, it is possible to accurately spray the pigment onto the desired location of the fabric through the atomizer controlled by a digital method, and achieve accurate and consistent coloring when dyeing products, thereby increasing the dyeing quality. Additionally, it is possible to dye using the organic pigment with certification under the Global Organic Textile Standard (GOTS) without using an additional chemical material. Since a large amount of water for washing is not needed, it is possible to reduce the amount of water down to the level of 5% compared to before, and there are no secondary carbon dioxide emissions, thereby preventing environmental pollution.

DETAILED DESCRIPTION

This specification describes the principles of the invention and discloses embodiments to clarify the scope of the invention and to enable one of ordinary skill in the art to practice the invention. The disclosed embodiments may be implemented in various forms.

Expressions such as "includes" or "may include" that may be used in various embodiments of the present disclosure refer to the presence of such features, operations, or components, etc. as disclosed, and do not limit one or more additional features, operations, or components, etc. Further, in various embodiments of the invention, the terms "includes" or "has" and the like are intended to designate the presence of the features, numbers, steps, actions, components, parts, or combinations thereof disclosed, and are not intended to preclude the possibility of the presence or addition of one or more other features, numbers, steps, actions, components, parts, or combinations thereof.

When a component is referred to as being "connected or coupled" to another component, it is to be understood that such component may be directly connected or coupled to such other component, but that there may also be new other components between such component and such other component. On the other hand, when a component is referred to as being "directly connected" or "directly coupled" to another component, it is to be understood that no new other component exists between said component and said other component.

As used herein, terms such as first, second, and the like may be used to describe various components, but the components are not to be limited by the terms. The terms are used only to distinguish one component from another.

Hereinafter, embodiments of the present disclosure will be described in detail with reference to the accompanying drawings.

Figure 1:
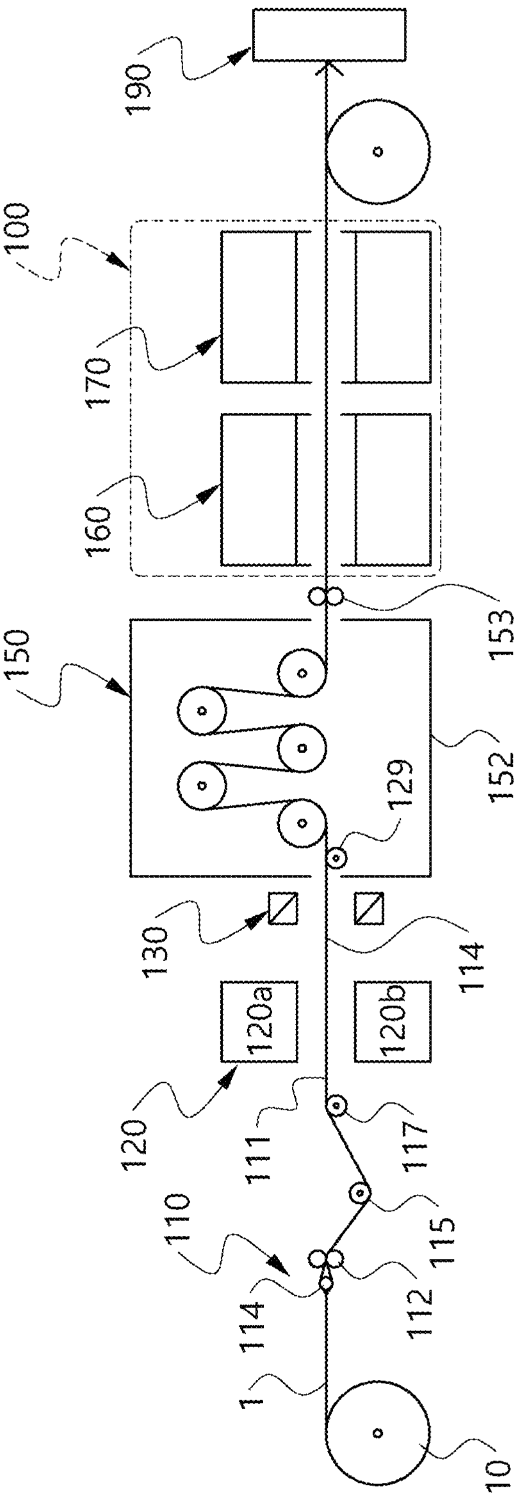
FIG. 1 is a conceptual diagram of a dyeing system for performing a spray dyeing method according to the related art.

FIG. 1 is a conceptual diagram of a dyeing system for performing a spray dyeing method according to the related art.

The conventional spray dyeing method is configured to dye a yarn type substrate before yarns are made into a woven fabric or a knitted fabric. The dyeing system of FIG. 1 illustrates the configuration of each stage of an exemplary dyeing machine therefor.

In the conventional dyeing system, the substrate 1 is supplied wound on a roll 10 and travels in a direction towards the dyeing system through a transfer roller 117. In a fixed station 110 for fixing the position of the substrate 1, folded parts are removed while the substrate 1 passes through a spreader bar 114 that opens the substrate 1 and between a pair of ring guides 112. The ring guides 112 include a pair of balls, and may keep the substrate 1 taut when engaged with each other during rotation around the vertical axis. Additionally, the spreader bar 114 plays a role in removing wrinkles or folds in the substrate 1.

The substrate 1 having passed through the spreader bar 114 and between the ring guides 112 gets loose while passing below a roller 115, so as to maintain proper tension in the substrate 1 and guide the substrate 1 toward the transfer roller 117.

When the transfer roller 117 pulls the substrate 1 across the top of the roller 117 during rotation, the substrate 1 travels into a dyeing station 120. In the dyeing station 120, a dye is sprayed onto the surface of the substrate 1. For example, the dyeing station 120 includes an upper spraying system 120*a* and a lower spraying system 120*b* to spray the dye onto the flat substrate 1.

In the conventional dyeing system, the dye sprayed from the dyeing station 120 is a chemical organic compound such as indigo dye. Additionally, in the dyeing system, the dye comes out of a container (not shown) by a hydraulic pump (not shown). When the dyeing station 120 includes the upper and lower spraying devices 120*a*, 120*b*, each spraying device 120*a*, 120*b* may be connected to the hydraulic pump and the container. Some dyeing systems may further include a heating device 130 at the rear end of the dyeing station 120 to induce chemical reaction of the dye.

Subsequently, the dyed substrate 1 travels on one or more rollers of a fixed station 150 by a guide roller 129, and the substrate 1 is exposed to atmospheric steam in a steam box 152 of the fixed station 150 to dry the dye on the substrate 1. The fixed station 150 exposes the substrate 1 to steam and heat in a sufficient manner and amount to diffuse the dye over the entire substrate 1, and while the substrate 1 continuously moves through the fixed station 150, the dye is attached to the substrate 1.

After the dye is affixed at the fixed station 150, the dyed substrate 1 moves forward to a cleaning station 100 including one or more cleaning devices 160, 170 through a ring guide 153. In the conventional dyeing system, the number of cleaning devices 160, 170 may be larger or smaller than shown in the drawing.

While the substrate 1 passes through the cleaning devices 160, 170, the substrate 1 is heated at a predetermined temperature (for example, 100° C. to 180° C.) and pressurized hot water is sprayed onto the substrate 1. The pressurized hot water plays a role in washing up the dyed substrate 1 to remove hydrolyzed dyes, remaining chemical materials and insoluble materials that have been not attached to the substrate 1, and compressing the substrate 1 by pressurization.

The dyed substrate 1 having passed through one or more cleaning devices 160, 170 of the cleaning station 100 is transferred to a collection station 190 corresponding to a collector unit. The substrate 1 may be transferred to the collection station 190 through a conveyor with a gradual incline or the like. However, the conventional dyeing system as described above requires a large amount of water at the fixed station 150 and the cleaning station 100 to affix and dry the dye, producing a large amount of contaminated water.

Figure 2:
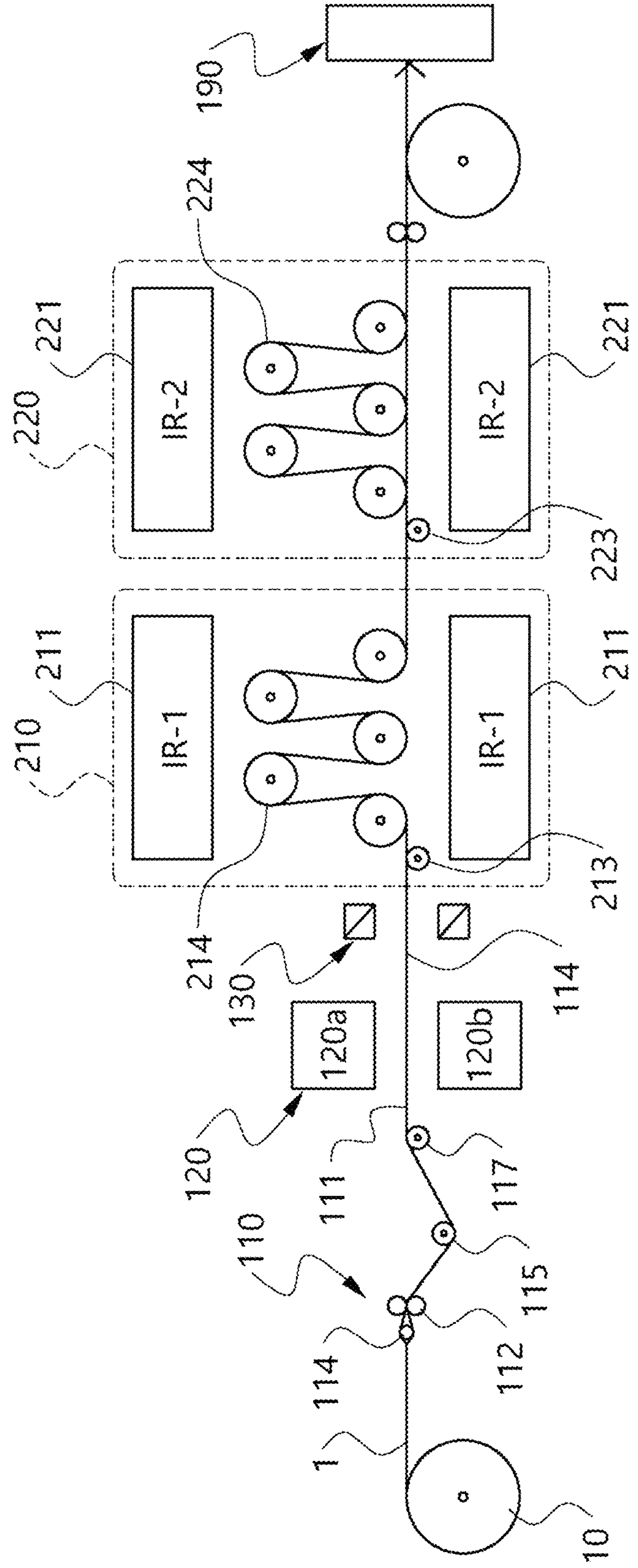
FIG. 2 is a conceptual diagram of a dyeing system for performing a spray dyeing method according to an embodiment.
Figure 3:
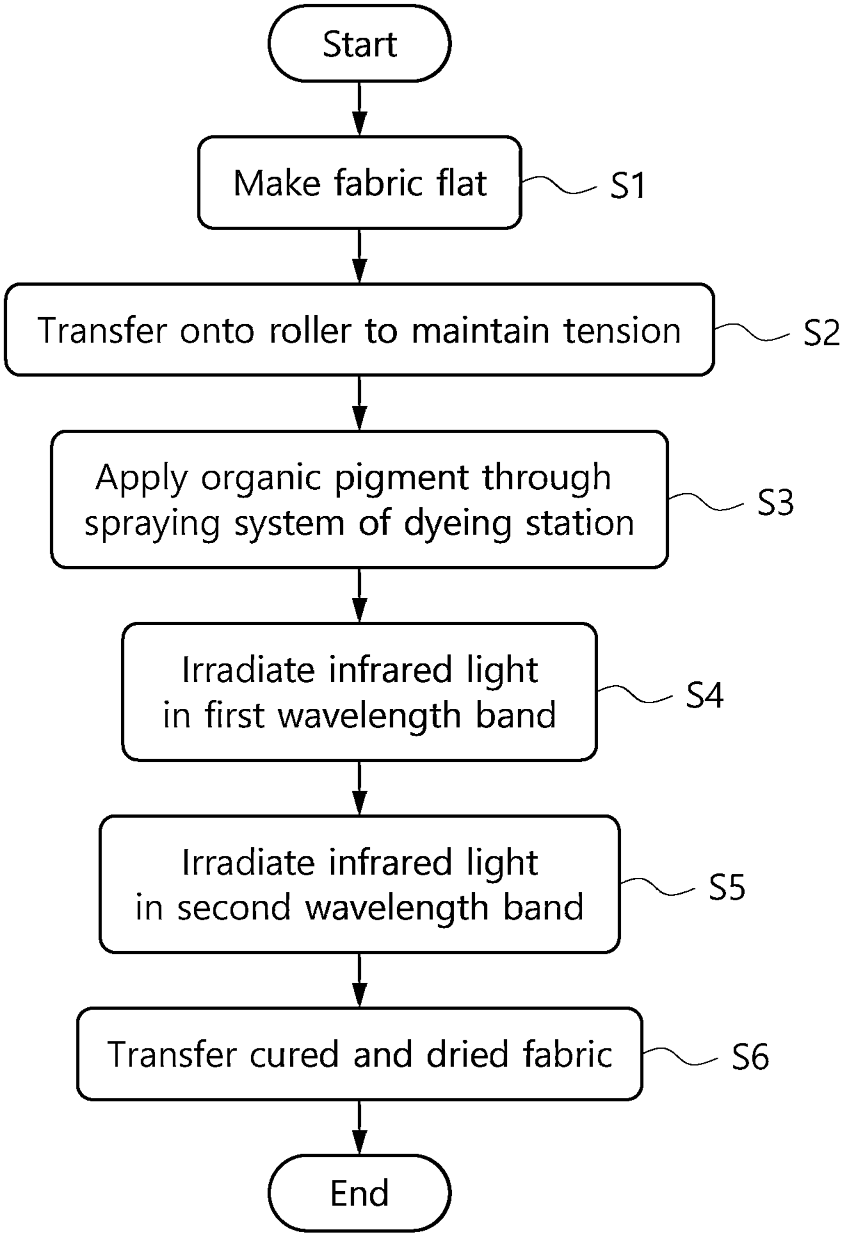
FIG. 3 is a flowchart showing each step of a spray dyeing method according to an embodiment.

FIG. 2 is a conceptual diagram of a dyeing system for performing a spray dyeing method according to an embodiment, and FIG. 3 is a flowchart showing each step of the spray dyeing method according to an embodiment.

The following description is made based on differences between the dyeing system for performing the spray dyeing method according to embodiments of the present disclosure and the dyeing system according to the conventional technology shown in FIG. 1. However, all the components of the conventional dyeing system may not be required to perform the spray dyeing method according to embodiments, and the dyeing system shown in FIG. 2 is intended to illustrate only an example of an apparatus for performing the spray dyeing method according to embodiments.

That is, the spray dyeing method according to embodiments may be realized using only some of the stages of the dyeing system shown in FIG. 2. Further, in one or more stages, the spray dyeing method according to embodiments may be realized using the dyeing system having an architecture that is different from that shown in FIG. 2.

Referring to FIGS. 2 and 3, in the spray dyeing method according to an embodiment, the substrate 1 is transferred in a direction to allow it to pass through at least the dyeing station 120 and drying stations 210, 220 of the dyeing system. For example, the substrate 1 may be made flat by the spreader bar 114 and the ring guides 112 (S1), and transferred through one or more rollers 115, 117 to maintain tension (S2). However, in the spray dyeing method according to embodiments, the method of transferring the substrate 1 is not limited by the architecture of the dyeing system shown in FIG. 2.

In the embodiments of the present disclosure as described below, the substrate 1 is explained as a fabric such as a woven fabric or a knitted fabric. However, the substrate 1 to which the spray dyeing method according to embodiments of the present disclosure may be applied is not limited thereto. For example, in another embodiment, the spray dyeing method according to embodiments may be performed on yarns as the substrate.

While the substrate 1 is transferred through the dyeing station 120, a pigment may be applied to the substrate 1 through the spraying systems 120*a*, 120*b* of the dyeing station 120 (S3). For example, each spraying system 120*a*,

120*b* may be a rotary atomizer. It may be possible to deliver the pigment to the substrate 1 in an accurate and controlled manner using the rotary atomizer, thereby dyeing the substrate 1 with consistent coloring while maintaining accuracy.

In one embodiment, the first spraying system 120*a* and the second spraying system 120*b* may operate complementarily. For example, the operation of the first spraying system 120*a* and the second spraying system 120*b* may be controlled based on a movement speed and a rotation angle of the substrate 1 so that the pigment can be evenly delivered to the entire surface of the substrate 1. Here, the rotation angle and the movement speed of the base material may be obtained through various sensors, such as an image sensor or the like.

Also, in one example, the spraying angles of the first spraying system 120*a* and the second spraying system 120*b* may be symmetrical to each other based on a line in a direction perpendicular to the substrate 1, or may be symmetrical to each other based on a line inclined with respect to the substrate 1. In other words, the first spraying system 120*a* and the second spraying system 120*b* may be installed facing each other or staggered from each other.

In addition, in one example, a predetermined vibration may be applied when the substrate 1 passes through the spraying systems 120*a*, 120*b*. This vibration may allow the pigment delivered to the substrate to effectively penetrate into the substrate. Such vibration may be provided in one or more of a first direction that is the same as the direction of travel of the substrate and a second direction that is perpendicular to the direction of travel of the substrate.

Furthermore, in one example, the first spraying system 120*a* and the second spraying system 120*b* may dynamically change their distance from the substrate 1 when spraying the pigment. For this purpose, each of the first spraying system 120*a* and the second spraying system 120*b* may be movably mounted to adjust the distance from the substrate 1. By dynamically adjusting the distance between the substrate and each spray system, it is advantageous to apply pigments to the substrate according to the type and purpose of the substrate.

In the embodiments of the present disclosure, the pigment used to dye the substrate 1 may be an organic pigment. For example, the organic pigment with certification under the Global Organic Textile Standard (GOTS) may be supplied to the dyeing station 120. However, in this disclosure, the organic pigment may include polycyclic materials, azo-based materials containing nitrogen, materials in metal complex form, acidic or basic salts and so on, and is not limited to a particular material.

Subsequently, the pigment coated on the substrate 1 may be cured while the substrate 1 coated with the pigment passes through the drying stations 210, 220. The embodiments of the present disclosure cure the pigment by infrared irradiation onto the substrate 1, as opposed to the conventional dyeing method.

For example, the process of irradiating infrared light onto the substrate 1 may include the step (S4) of irradiating infrared light in a first wavelength band through the first drying station 210 having an infrared irradiation unit, and the step (S5) of irradiating infrared light in a second wavelength band that is different from the first wavelength band through the second drying station 220 having another infrared irradiation unit.

The first drying station 210 may include a pair of first infrared irradiation units 211 above and under the substrate 1 for infrared irradiation onto two surfaces of the substrate 1, respectively. Likewise, the second drying station 220 may include a pair of second infrared irradiation units 221 above and under the substrate 1 for infrared irradiation onto two surfaces of the substrate 1, respectively.

The first drying station 210 may include a guide roller 213 to transfer the substrate 1 and a plurality of rollers 214 arranged spaced apart from each other to uniformly expose the substrate 1 transferred through the guide roller 213 to infrared light while maintaining tension. Likewise, the second drying station 220 may include a guide roller 223 to transfer the substrate 1 and a plurality of rollers 224 arranged spaced apart from each other to uniformly expose the substrate 1 transferred through the guide roller 223 to infrared light while maintaining tension.

The infrared light in the first wavelength band irradiated by the first infrared irradiation unit 211 plays a role in opening a molecular structure of a polymer of yarns that make up the substrate 1 to allow the pigment to be attached well. In an embodiment, the first wavelength band may be near-infrared light of 0.78 to 2.5 μm. Additionally, the infrared light in the second wavelength band irradiated by the second infrared irradiation unit 221 plays a role in curing the pigment attached to the substrate 1. In an embodiment, the second wavelength band may be far-infrared light of 50 to 1000 μm.

In an embodiment, the infrared light in the first wavelength band may be irradiated onto the substrate 1 for 2 to 3 seconds. Additionally, the infrared light in the second wavelength band may be irradiated onto the substrate 1 for 2 to 3 seconds. However, the duration and intensity of irradiation of the infrared light in the first wavelength band and/or the infrared light in the second wavelength band may be appropriately determined according to the shape and type of the substrate 1 and the type of the organic pigment dyed on the substrate 1, and is not limited by the numerical value described in this disclosure. For example, the infrared irradiation conditions may be determined according to the characteristics of the organic pigment used to dye without causing deterioration of the characteristics of the pigment.

In an embodiment, the amount of energy by the infrared light, which is determined by multiplying the duration by the intensity, can be determined variably depending on the material of the polymer forming the substrate 1. For example, materials such as microfiber, wool, nylon, and spandex generally tend to absorb infrared light, and thus have low reflectivity to the infrared light. Meanwhile, polyester fabric may have various characteristics depending on the specific material forming the fabric, some may tend to absorb infrared light while others may tend to reflect infrared light.

Therefore, in irradiating the infrared light having the first wavelength band and the second wavelength, one or both of the intensity of the infrared light and the duration of the irradiation can be adjusted so that the amount of energy (i.e., the product of the infrared intensity and the duration of irradiation) delivered to the substrate 1 via the infrared light is inversely proportional to the infrared absorption rate of the substrate 1.

Also, in an embodiment, the amount of energy of the infrared radiation applied to the substrate 1 can be varied by adjusting the movement speed of the substrate 1 while keeping the intensity of the infrared radiation and the irradiation time constant. In this case, the amount of energy delivered to the substrate 1 can be easily changed by changing the rotational speed of the conveyance elements (e.g., rollers 115, 117, 213, 223) moving the substrate 1 without changing the devices comprising the first and second infrared irradiation units 211, 222.

Meanwhile, among the organic pigments that are cured through the drying stations 210, 220, some pigments may be cured through contact with moisture and/or oxygen in the atmosphere, such as silicone organic resins. In this case, the infrared light in the second wavelength band plays a role in accelerating the curing speed by heating through energy transfer. In order to achieve uniform dyeing quality, the drying station 220 may be equipped with one or more of a humidity sensor and a pressure sensor, and the total amount of energy delivered by the second infrared irradiation unit 222 may be adjusted in response to environmental variables measured by these sensors. Regulation of the amount of infrared energy may be accomplished by adjusting the intensity of the infrared light and/or the duration of the irradiation, as previously described.

Finally, the substrate 1 on which the pigment was cured and dried while passing through the drying stations 210, 220 may be transferred to the collection station 190 corresponding to a collection unit using a conveyor with a gradual incline or any other transfer means (S6). In an embodiment, after the substrate 1 has passed through the drying stations 210, 220, the substrate 1 may pass through another ring guide before it is transferred to the collection station 190.

Figure 4:
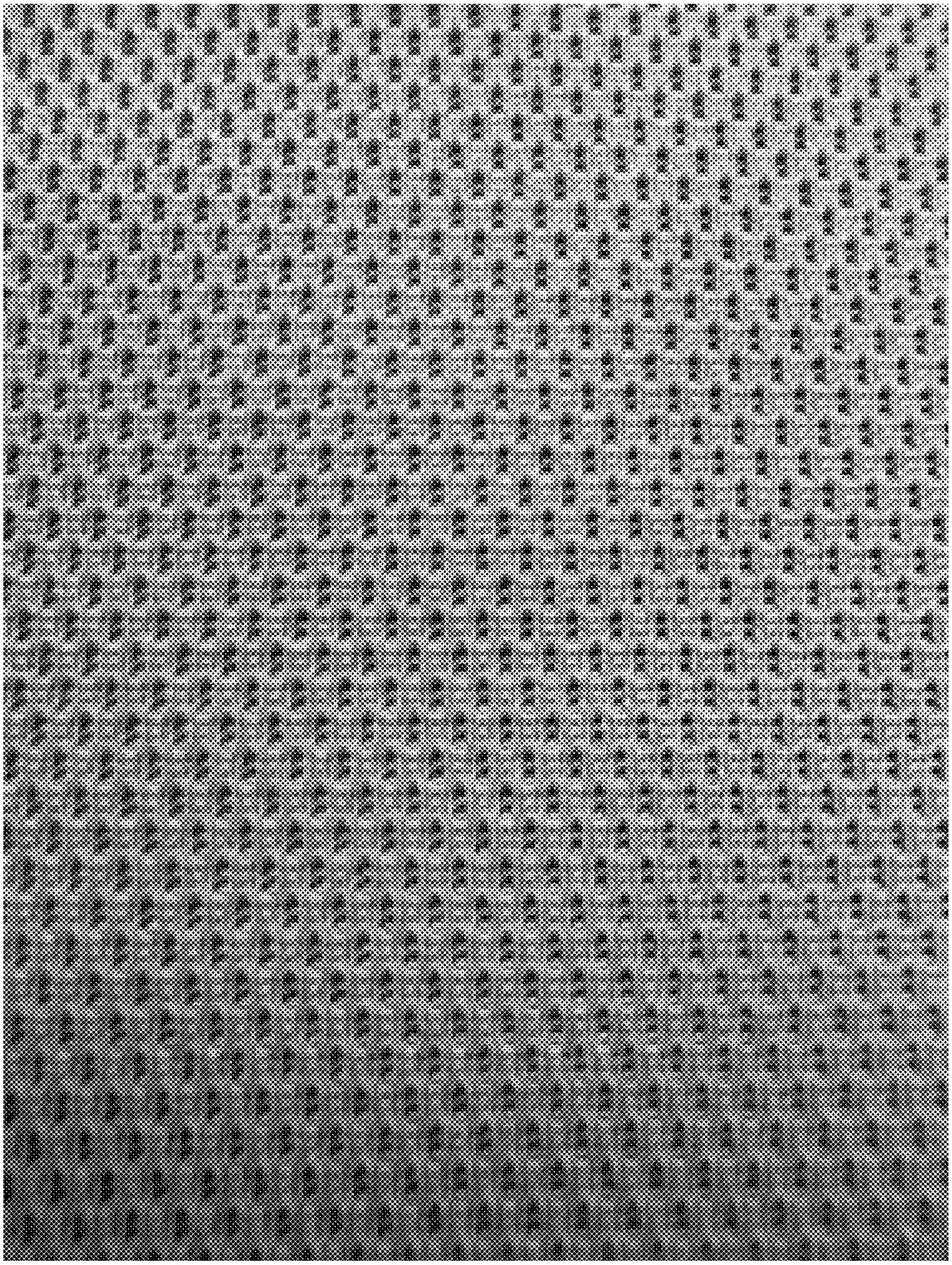
FIG. 4 is an image of a dyed fabric by a spray dyeing method according to an embodiment.

FIG. 4 is an image of the dyed fabric by the spray dyeing method according to an embodiment. As shown in FIG. 4, it was confirmed that dyeing was carried out on the fabric, not yarns, through the rotary atomizer and the entire fabric was uniformly dyed with even color.

The conventional dyeing using the atomizer is limited to yarn dyeing by indigo dye, but by the spray dyeing method according to embodiments of the present disclosure, it may be possible to achieve fabric dyeing using a variety of organic dyes, and attach the pigment to the fabric by the infrared curing process using no or little water during dyeing, thereby significantly reducing environmental pollution compared to the conventional dyeing method.

While the present disclosure has been hereinabove described with reference to the embodiments shown in the accompanying drawings, this is provided by way of illustration and those skilled in the art will understand that various changes and modifications may be made thereto. However, it should be noted that such modifications fall in the scope of technical protection of the present disclosure. Accordingly, the true scope of protection of the present disclosure should be defined by the technical spirit of the appended claims.

What is claimed is:

1. A spray dyeing method, comprising:

continuously moving a substrate in a direction;

spraying an organic pigment onto the substrate using a spraying system while moving the substrate forward through a dyeing station; and allowing the substrate coated with the organic pigment to pass through a drying station including an infrared irradiation unit to cure the organic pigment, wherein curing the organic pigment comprises:

irradiating infrared light in a first wavelength band onto the substrate coated with the organic pigment; and after irradiating the infrared light in the first wavelength band, irradiating infrared light in a second wavelength band onto the substrate, wherein the second wavelength band is different from the first wavelength band.

2. The spray dyeing method according to claim 1, wherein a first wavelength band is 0.78 to 2.5 μm.

3. The spray dyeing method according to claim 1, wherein a second wavelength band is 50 to 1000 μm.

4. The spray dyeing method according to claim 1, further comprising:

after curing the organic pigment, transferring the substrate to a collector without cleaning the substrate with a liquid including water.

* * * * *